(12) United States Patent
Setty

(10) Patent No.: US 10,552,372 B2
(45) Date of Patent: Feb. 4, 2020

(54) SYSTEMS, METHODS, AND COMPUTER-READABLE MEDIA FOR A FAST SNAPSHOT OF APPLICATION DATA IN STORAGE

(71) Applicant: Microsoft Technology Licensing, LLC, Redmond, WA (US)

(72) Inventor: Srinath Tumkur Venkatachala Setty, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 295 days.

(21) Appl. No.: 15/635,353

(22) Filed: Jun. 28, 2017

(65) Prior Publication Data

US 2018/0218000 A1 Aug. 2, 2018

Related U.S. Application Data

(60) Provisional application No. 62/452,427, filed on Jan. 31, 2017.

(51) Int. Cl.
*G06F 17/30* (2006.01)
*G06F 16/11* (2019.01)
*G06F 16/16* (2019.01)

(52) U.S. Cl.
CPC .......... *G06F 16/128* (2019.01); *G06F 16/164* (2019.01)

(58) Field of Classification Search
CPC ....... G06F 16/128; G06F 16/28; G06F 16/164
See application file for complete search history.

(56) References Cited

U.S. PATENT DOCUMENTS

| 5,963,959 A | * | 10/1999 | Sun ....................... G06F 16/273 |
| 6,847,971 B1 | * | 1/2005 | Balaraman .............. H04L 69/04 |
| 8,370,303 B1 | | 2/2013 | Ceschim et al. |
| 9,665,304 B2 | * | 5/2017 | Iwanicki ............... G06F 3/0619 |
| 2007/0124671 A1 | * | 5/2007 | Hackworth ............. G06F 16/28 715/210 |

(Continued)

OTHER PUBLICATIONS

"International Search Report and Written Opinion Issued in PCT Application No. PCT/US2018/014609", dated Mar. 27, 2018, 11 Pages.

(Continued)

*Primary Examiner* — Greta L Robinson
(74) *Attorney, Agent, or Firm* — Drinker Biddle & Reath LLP

(57) ABSTRACT

Techniques for a fast snapshot of application data in a storage system are disclosed. One computer-implemented method includes: receiving, over an electronic communications network, a first command to create a table; creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row and a payload of the special metadata row. The key of the special metadata row is initialized to a snapshot identifier, and the payload of the special metadata row is initialized to zero, and an entity tag of the special metadata row is initialized to a random value.

20 Claims, 13 Drawing Sheets

(56) References Cited

U.S. PATENT DOCUMENTS

| | | |
|---|---|---|
| 2007/0226730 A1 | 9/2007 | Coyle et al. |
| 2013/0054911 A1* | 2/2013 | Keller .................... G06F 12/16 |
| | | 711/162 |
| 2013/0117232 A1 | 5/2013 | Lee et al. |
| 2014/0101108 A1 | 4/2014 | Stewart et al. |
| 2014/0279900 A1 | 9/2014 | Gupta et al. |
| 2014/0279907 A1 | 9/2014 | Koza et al. |
| 2015/0142739 A1 | 5/2015 | Mutalik et al. |
| 2015/0142747 A1 | 5/2015 | Zou |
| 2015/0286436 A1 | 10/2015 | Olson et al. |
| 2015/0301900 A1 | 10/2015 | Whitehead et al. |
| 2016/0124669 A1 | 5/2016 | Harris et al. |
| 2016/0203013 A1 | 7/2016 | Bayapuneni et al. |
| 2016/0275085 A1 | 9/2016 | Soundararajan et al. |
| 2016/0275089 A1 | 9/2016 | Soundararajan et al. |

OTHER PUBLICATIONS

Rahman, et al., "Software-defined Consistency Group Abstractions for Virtual Machines", In Proceedings of the 4th Workshop on Distributed Cloud Computing, Jul. 25, 2016, 6 pages.

* cited by examiner

SYSTEMS, METHODS, AND COMPUTER-READABLE MEDIA FOR A FAST SNAPSHOT OF APPLICATION DATA IN STORAGE

CROSS-REFERENCE TO RELATED APPLICATIONS

The present application claims the benefit of priority to U.S. Provisional Application No. 62/452,427, entitled "SYSTEMS, METHODS, AND COMPUTER-READABLE MEDIA FOR A FAST SNAPSHOT OF APPLICATION DATA IN STORAGE," and filed on Jan. 31, 2017, which is incorporated herein by reference in its entirety.

TECHNICAL FIELD

Embodiments of the present disclosure relate generally to storing, accessing, and editing data. More specifically, embodiments of the present disclosure relate to creating a fast snapshot of application data in storage.

INTRODUCTION

In cloud and/or distributed computing, applications and services may be built, deployed, and managed through a network of managed data centers. Applications and services may store and access data in a database storage system, a cloud based storage systems, and/or a distributed storage system. For example, data and/or states of an application may be stored, updated, and retrieved by submitting commands and/or statements to a database application. To be correctly processed, the statements must comply with the database language that is supported by the database application. Some popular storage systems that use database languages include Microsoft's Azure, Amazon Web Services, Amazon's DynamoDB, Google's cloud storage, Apache Cassandra, MongoDB, etc.

Applications operated on devices (e.g., servers, computers, laptop computers, personal digital assistants, mobile telephones, virtual machines, etc.) access these storage systems via direct or remote network connections. When the application transmits a request to the storage system, the response time may depend upon a level of usage of the device's network connection, an amount of data being received and/or transmitted, and congestion at the storage system Enterprises increasingly have a need to store large amounts of data in data storage systems to support modern applications. However, relational databases are not generally designed to effectively scale and often are not agile enough to meet current application requirements. Accordingly, enterprises are increasingly employing NoSQL (e.g., "No SQL") databases to meet their data storage needs. NoSQL databases are able to store large volumes of data in a highly scalable infrastructure that is relatively fast and agile and generally provides superior performance over relational databases. Advantageously, NoSQL databases can be manipulated through object-oriented Application Programming Interfaces ("APIs"), offer relatively reliable code integration, and require fewer administrator resources to set up and manage as compared to relational databases.

However, current databases do not provide data management features useful for application snapshots. Further, current databases do not provide effective snapshot capabilities that allow users to save and/or restore a state of an application at particular point in time. Additionally, current databases that support snapshots do not provide an easy to implement storage method without a significant and/or negative impact on database performance.

Based on the foregoing, it is desirable to provide a mechanism for fast snapshot support that is easily implemented in current storage systems without a significant and negative impact on performance.

SUMMARY OF THE DISCLOSURE

According to certain embodiments, systems, methods, and computer-readable media are disclosed for a fast snapshot of application data in storage.

According to certain embodiments, a computer-implemented method for a fast snapshot of application data in a storage system is disclosed. One method comprising: receiving, over an electronic communications network, a first command to create a table; creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row and a payload of the special metadata row.

According to certain embodiments, a system for a fast snapshot of application data in a storage system is disclosed. One system comprising: a non-transitory memory; and one or more hardware processors coupled to the non-transitory memory and configured to read instructions from the non-transitory memory to cause the system to perform a method for a fast snapshot of application data in a storage system, the method comprising: receiving, over an electronic communications network, a first command to create a table; creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row and a payload of the special metadata row.

According to certain embodiments, a non-transitory computer-readable medium having stored thereon computer-readable instructions executable to cause a computer to perform a method for a fast snapshot of application data in a storage system is disclosed. One computer-readable medium having stored thereon computer-readable instructions executable to cause a computer to perform the method including: receiving, over an electronic communications network, a first command to create a table; creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row and a payload of the special metadata row.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

In the course of the detailed description to follow, reference will be made to the attached drawings. The drawings show different aspects of the present disclosure and, where appropriate, reference numerals illustrating like structures, components, materials and/or elements in different figures are labeled similarly. It is understood that various combinations of the structures, components, and/or elements, other than those specifically shown, are contemplated and are within the scope of the present disclosure.

Moreover, there are many embodiments of the present disclosure described and illustrated herein. The present disclosure is neither limited to any single aspect nor embodiment thereof, nor to any combinations and/or permutations of such aspects and/or embodiments. Moreover, each of the aspects of the present disclosure, and/or embodiments thereof, may be employed alone or in combination with one or more of the other aspects of the present disclosure and/or embodiments thereof. For the sake of brevity, certain permutations and combinations are not discussed and/or illustrated separately herein.

Figure 1:
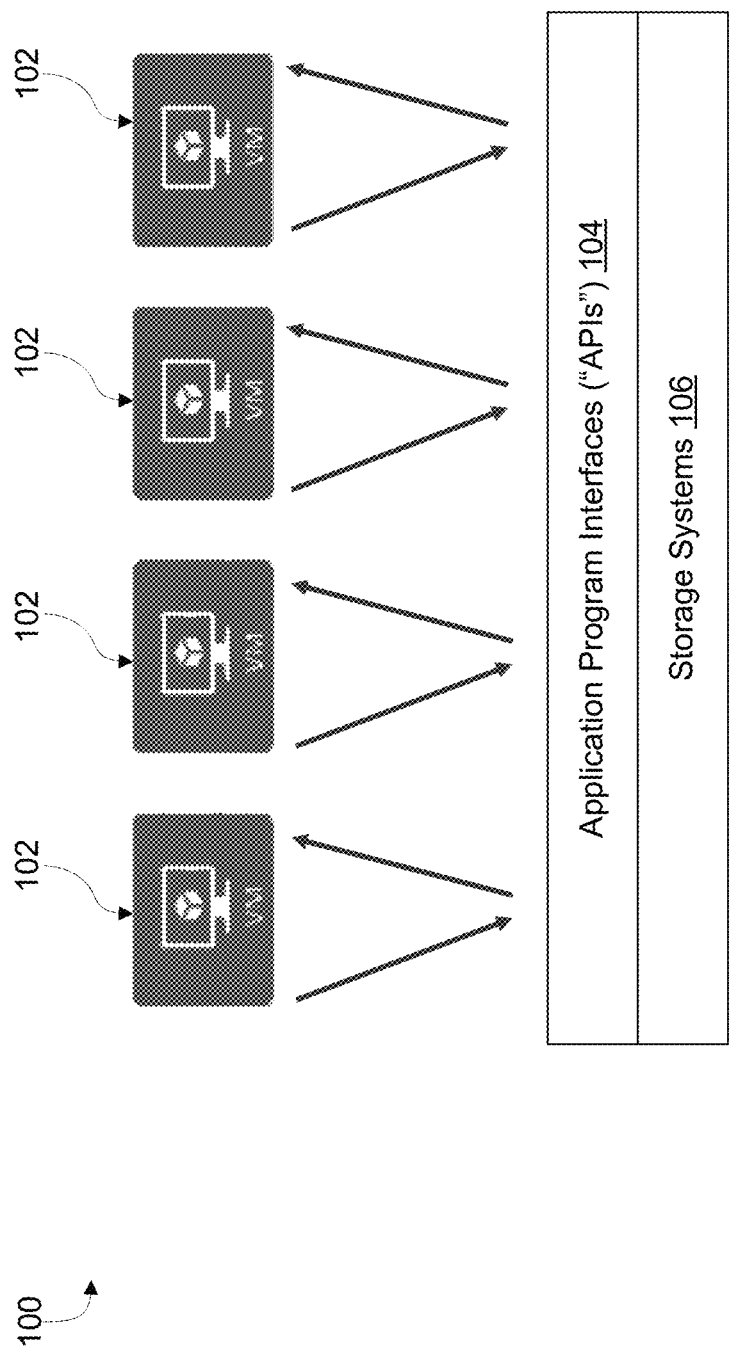
FIG. 1 depicts an exemplary embodiment for an environment for fast snapshots of an application state in storage, according to embodiments of the present disclosure.

Again, there are many embodiments described and illustrated herein. The present disclosure is neither limited to any single aspect nor embodiment thereof, nor to any combinations and/or permutations of such aspects and/or embodiments. Each of the aspects of the present disclosure, and/or embodiments thereof, may be employed alone or in combination with one or more of the other aspects of the present disclosure and/or embodiments thereof. For the sake of brevity, many of those combinations and permutations are not discussed separately herein.

DETAILED DESCRIPTION OF THE EMBODIMENTS

One skilled in the art will recognize that various implementations and embodiments of the present disclosure may be practiced in accordance with the specification. All of these implementations and embodiments are intended to be included within the scope of the present disclosure.

As used herein, the terms "comprises," "comprising," "have," "having," "include," "including," or any other variation thereof, are intended to cover a non-exclusive inclusion, such that a process, method, article, or apparatus that comprises a list of elements does not include only those elements, but may include other elements not expressly listed or inherent to such process, method, article, or apparatus. The term "exemplary" is used in the sense of "example," rather than "ideal."

For the sake of brevity, conventional techniques related to systems and servers used to conduct online auctions and other functional aspects of the systems and servers (and the individual operating components of the systems) may not be described in detail herein. Furthermore, the connecting lines shown in the various figures contained herein are intended to represent exemplary functional relationships and/or physical couplings between the various elements. It should be noted that many alternative and/or additional functional relationships or physical connections may be present in an embodiment of the subject matter.

Reference will now be made in detail to the exemplary embodiments of the disclosure, examples of which are illustrated in the accompanying drawings. Wherever possible, the same reference numbers will be used throughout the drawings to refer to the same or like parts.

The present disclosure relates to, among other things, creating, retrieving, deleting, and/or rolling back of one or more fast snapshots of application data in storage. More particularly, the present disclosure discloses a set of techniques and protocols that may enable the creating of one or more consistent snapshots of a state of an application stored in a storage system, such as Microsoft Azure table storage. While the present disclosure describes techniques in the context of Microsoft Azure table storage, a person of ordinary skill in the art may apply the techniques described herein to other storage systems, cloud storage systems, and distributed storage systems, such as Amazon's DynamoDB, Google's cloud storage, Apache Cassandra, MongoDB, etc.

To support snapshots, a client library may be created that exposes a new cloud table, also referred to as a Snapshot Table, which exposes new application program interfaces ("APIs") in addition to a standard table interface.

Embodiments of the present disclosure include a method for creating one or more consistent snapshots of application state in storage, such as in cloud storage and/or distributed storage, in a constant time, regardless of an amount of application data, and without the use of lock-based synchronization. Further embodiments of the present disclosure may include a method for retrieving an object from an older snapshot created by the method described above and/or below. Yet further embodiments of the present disclosure may include a method for safely deleting at least one snapshot of the methods described above and/or below. Finally, embodiments of the present disclosure may include a method for one or more rollbacks by creating a new snapshot by the methods described above and/or below.

To support creating consistent snapshots, embodiments of the present disclosure may not make modifications to an existing storage service system. Specifically, embodiments of the present disclosure may enable snapshots storage by creating a consistent snapshot in a separate table. More importantly, embodiments of the present disclosure may reduce the amount of time needed to create a new snapshot to a constant value. Further, embodiments of the present disclosure may use a single storage operation regardless of the amount of data in cloud storage.

Embodiments of the present disclosure may use a table storage system, such as Azure Table Storage, which is a highly available NoSQL storage engine that provides strong consistency guarantees. A table storage system may store data in schema-less tables. Inside the schema-less table, each data item may be uniquely identified by a PartitionKey and a RowKey. To interact with the data in the table, a user may issue seven basic operations to a single data item, including Retrieval, Insert, Replace, Merge, Delete, InsertOrReplace, and/or InsertOrMerge.

To help a plurality of users to control concurrent data accesses to a single data item, table storage systems may implement entity tags ("eTags") and conditional writes. For each write operation, a storage engine of the table storage system may attach to the row a unique version identifier, such as the eTag. Replace, merge, and/or delete operations may perform conditional writes based on the eTags. For example, a user may provide an eTag in the requested operation, and the request may succeed only if the eTag of current data matches the one provided by the request of the user. Further, it is possible to have an unconditional update by setting the eTag to a special value, such as a "*."

Further, a table storage system may also allow one or more users to perform transactional writes to multiple rows inside a same partition. However, with current application program interfaces ("APIs"), some table storage systems may not support transactional access of more than two partitions or two tables.

To interact with the data in the table, embodiments of the present disclosure may supplement basic operations of a table storage system to include: CreateSnapshot( ), which may return a snapshot identifier; RetrieveFromSnapshot (partitionKey, rowKey, SnapshotId), which may retrieve a value from a snapshot; Rollback(SnapshotId), which may return a new snapshot identifier; DeleteSnapshot(SnapshotId), which may delete a snapshot; and GetSnapshotTableHistory( ), which may return snapshot table history information.

Additionally, embodiments of the present disclosure may overload the above-mentioned basic operations, and may prefix each of the operations with "SnapshotTable." For example, the overloaded basic operations may be SnapshotTableRetrieve, SnapshotTableInsert, SnapshotTableReplace, SnapshotTableMerge, SnapshotTableDelete, SnanshopTableInsertOrReplace, SnapshotTableInsertOrMerge, and SnapshotTableCreateIfNotExists.

A SnapshotTableCreateIfNotExists operation may create a new table using a table storage operation CreateIfNotExists( ). Further, the SnapshotTableCreateIfNotExists operation may create a special metadata row in the new table, which may store the current snapshot identifier ("SnapshotId"), and may initialize SnapshotId value to 0.

A CreateSnapshot operation may increment the SnapshotId stored in the underlying table.

A SnapshotTableInsert operation may use a table storage operation Insert. Additionally, the SnapshotTableInsert operation may add one or more additional attributes including: (i) "SnapshotId," which keeps track of the snapshot identifier when the last update was made to a row; (ii) a delete bit; (iii) a version identifier, which may monotonically increase for each change of the row; and (iv) a virtual entity tag ("eTag").

The SnapshotTableInsert operation may first read the current value of the SnapshotId from payload of the special metadata row in the table. Next, the SnapshotTableInsert operation may set the value of the SnapshotId of the row to the current value of the payload of the special metadata row. Further, the SnapshotTableInsert operation may also initialize the version identifier to an initial value, such as one or zero, and set a random virtual eTag value. Then, the SnapshotTableInsert operation may call the Insert( ) operation of the underlying table storage system.

If the Insert( ) operation fails due to an existing row, then the row may be retrieved, and the delete bit may be checked. If the delete bit indicates that the row is deleted, then the new version identifier may be set to the initial value of the version identifier, the delete bit of the row may be set to false, and the row may be replaced with the new content.

A SnapshotTableReplace(row, eTag) operation and a Merge operation may use a table storage operation Replace and Merge operation respectively, and may operate in a similar manner. For example, the SnapshotTableReplace (row, eTag) operation may read the requested row that the application wants to modify from the underlying table, and the operation may read in parallel the current SnapshotId from the special metadata row. The operation may also check a user-level condition, such as whether the provided eTag matches the row's virtual eTag and whether the row indicates that it must not be deleted.

If the user-level condition check passes, the SnapshotTableReplace(row, eTag) operation may set the new version identifier to the older version identifier plus one, and may generate a random, new virtual eTag. Then, the operation may determine a new value of the SnapshotId of the row as a greater value of either the old SnapshotId of the row and the current SnapshotId from the special row. When the old SnapshotId of the row is lower than the current SnapshotId from the special row, the new SnapshotId of the row may be set to the current SnapshotId from the special row. When the old SnapshotId of the row is greater than the current SnapshotId from the special row, the operation may discard the "stale" current SnapshotId from the special row. Thus, the operation may guarantee that the SnapshotId and the version identifier of a row never decrease.

When the old SnapshotId of the row is equal to the current SnapshotId from the special, then the operation may conduct a Replace operation conditioned on the old physical eTag of the row.

Otherwise, SnapshotTableReplace(row, eTag) operation may execute a copy-on-write, which may backup the old row to a snapshot table and then replace the row. To execute a copy-on-write, the row may be copied to another table, such as a table named "snapshot_<azure_table_name>_<SnapshotId>." The row being copied may already exist in the snapshot table. If a version identifier of the row that is being copied is larger than or equal to a version identifier of a row currently in the snapshot table, then the operation may proceed. This may guarantee, for a given row and SnapshotId, the version identifier of the row in the snapshot table may never decrease.

When the version identifier of the row that is being copied is larger than or equal to a version identifier of a row currently in the snapshot table, then the row condition on the physical eTag of the original row may be replaced. If the operation fails, then the failure of the operation may be due to concurrent modification. Further, there is no need to clean up the snapshot table because the other Replace operations may overwrite and/or has overwritten the snapshot table with correct data.

Thus, the embodiment of the present disclosure is lock-free, and the system may ignore any client failure (without affecting any correctness properties) based on the following. One, the SnapshotId and the version identifier of a row may never decrease, and every successful update increments the version identifier by one. Two, for any given row "r" and SnapshotId "s," the version identifier of the row "r" in snapshot_<table_name>_<"s"> never decreases, and is not larger than the version identifier of the row "r" in the main table. Three, once a successful update has updated the SnapshotId of a row from "s" to "s'" ("s'" being greater than "s"), the row in snapshot_<table_name>_<"s"> may be frozen forever by the copy-on-write of the update operation. In other words, the snapshot "s" of the row is set to the value before the update operation took place. Four, the content of a row in snapshot_<table_name>_<"s"> is not valid until the SnapshotId of the row in main table is larger than "s," and a RetrieveFromSnapshot operation may not read from an invalid snapshot table, as explained below.

A SnapshotTableDelete(row, eTag) operation may not simply delete the row. If a row was simply deleted, then operation may not be able to distinguish between (i) a row that never exists in history and (ii) a row that had existed and then was deleted. This scenario may miss SnapshotId information, and thus, the operation may not do a copy-on-write correctly. A copy-on-write may be needed if the row has once existed and then been deleted.

Instead, SnapshotTableDelete(row, eTag) operation may mark the delete bit as "on" for a deleted row. Therefore, a SnapshotTableDelete(row, eTag) operation may be transferred into a special replace operation, and go through the same method, as described above.

A RetrieveFromSnapshot(partitionKey, rowKey, SnapshotId) operation may allow for the reading from an old snapshot, such as a SnapshotId value less than the current SnapshotId value. To read the current value of a row, the RetrieveFromSnapshot(partitionKey, rowKey, SnapshotId) operation may act as a normal Retrieve( ) operation.

For example the requested row may be read from the underlying table, and the current SnapshotId may be read from the special row. Then, method may check whether the SnapshotId value is less than the current SnapshotId value.

According to the retrieved row, if the row exists and the row.SnapshotId is greater than the SnapshotId, then the snapshot of the row in table SnapshotId is valid. Further, the table "snapshot_<table_name>_<SnapshotId>" may be read. If the row is not found, then the operation may continue to read "SnapshotId-1," "SnapshotId-2," etc., until a first result is encountered. If all reads fail, then a "row does not exist" may be returned.

If the row exists and row.SnapshotId is less than or equal to the SnapshotId, the data stored in the row may be returned. However, in this scenario, the target snapshot may not yet be valid, as discussed with point four above, and the operation may be vulnerable to concurrent updates from other users. For example, if an update in SnapshotId is slow, the row may be overwritten with new data. Future, reads of this row in SnapshotId may return a different result.

To solve this problem, the snapshots of the row for all SnapshotIds before current SnapshotId (note that current SnapshotId is greater than SnapshotId) may be solidified. The snapshots of the row may be solidified by issuing a "dummy" update of the row in the current SnapshotId. This operation may not change the content and the virtual eTag of the row, but the operation may update row.SnapshotId to the current SnapshotId, and may increase the version identifier by one. As mention in point three above, this operation may freeze all the snapshots of the row before current SnapshotId, including SnapshotId. Then, the current content of the row may be returned.

In a Rollback(partitionKey, rowKey, SnapshotId) operation, it may be assumed that there are no new writes and no new snapshots created. Removing this assumption may require implementing table-level locks, which may increase the cost of all the above operations. The Rollback(partitionKey, rowKey, SnapshotId) operation may also be treated as a special update operation that updates all the involved rows to their old values. Therefore, the Rollback(partitionKey, rowKey, SnapshotId) operation may only revert the content, and the row's SnapshotId value and version identifier may continue to increment.

The Rollback(partitionKey, rowKey, SnapshotId) operation may create a new snapshot using CreateSnapshot( ) as described above. The new snapshot may store the state of the database before the rollback, and may allow a user to "undo" the rollback by rolling back to the new snapshot.

Then, the Rollback(partitionKey, rowKey, SnapshotId) operation may retrieve row keys from the underlying table whose row.SnapshotId is greater than the SnapshotId. For each key, the version of the row at SnapshotId may be retrieved using RetrieveFromSnapshot( ) and the row in the underlying table may be replaced using the Replace( ) operation.

The fact that the Rollback(partitionKey, rowKey, SnapshotId) operation is a special update operation allows for the correctness of "RetrieveFromSnapshot" operation. Thus, all the snapshots are physically organized in a single threaded way, even with arbitrarily many rollbacks (and rollback-of-rollbacks . . . ). Therefore, a retrieve from history may always get the correct result by simply traversing the snapshot tables backward in the chain. If a row is rolled back between snapshot "s" and snapshot "s+1," the update operation issued by the rollback in SnapshotId "s+1" may prevent any RetrieveFromSnapshot operation from going beyond snapshot "s+1" back to snapshot "s."

When a snapshot is deleted, all the contents of the snapshot may be pushed to the next snapshot. If the row exists in the next snapshot table, it means the row was modified in the next snapshot, so we can simply discard the old value. Because the snapshots are physically single threaded even with rollbacks, the above operation may be correct even with rollbacks.

In embodiments of the present disclosure, a snapshot's logical relationship may be tracked with a GetSnapshotTableHistory( ) operation. Implementing a rollback operation as a special update operation may simplify the design of this operation. However, it may be possible to lose a logical relationship between the snapshots. For example, if snapshot 5 is generated by first rolling back to snapshot 2 and then making some changes, the logical parent of snapshot 5 should be snapshot 2, rather than snapshot 4.

To solve this problem, the logical relationships of all the snapshots (including those deleted ones) may be tracked in the special metadata row. Thus, a user may retrieve the information by calling the GetSnapshotTableHistory( ) operation.

While the SnapshotTable storage system does not guarantee all the operations to be linearizable, the SnapshotTable storage system provides that (i) all the read/write operations are linearizable; (a batch operation in a single partition is a strictly serializable transaction) and (ii) the create snapshot operation is linearizable with write/batch write operations. Moreover, the order of write operations are the same as their order in (i).

Linearization may ensure that: (1) all the write operations that finish before the create snapshot operation starts may be stored in the old snapshot; (2) all the write operations that start after the create snapshot operation finishes may be stored in the new snapshot; (3) write operations that are parallel with creating snapshot may be stored in either one of the snapshots (later writes on row x (with respect to linearization order) may not be in earlier snapshots than earlier writes on row x); and (4) the snapshot may be causally consistent: if W(y) causally depends on W(x), (W(y) cannot be in earlier snapshots than the snapshot that contains W(x)).

The first property may ensure the SnapshotTable storage system to be linearizable for normal read/write operations. The second property may ensure the SnapshotTable storage system to create reasonable snapshots, i.e., a SnapshotTable operation still creates real-time, consistent snapshots of the entire table.

Proof of Consistency Properties:

Note that every write have two sub-operations: (1) get SnapshotId and (2) write the row in place. Since W(y) causally depends on W(x), then W(y) may not start earlier than the start time of second sub-operation of W(x). Otherwise, a client may not know any information about W(x) when issuing W(y). Therefore, the first sub-operation of W(y) happens after the first sub-operation of W(x). As SnapshotId never decreases, W(y) may not be stored in an earlier snapshot than W(x).

As discussed below, the SnapshotTable storage system may not guarantee linearization even on a single row. For example, client 1 may start to write row x, with the first step being read the current SnapshotId, which may be 5 in this example. Client 2 may take a snapshot, and thus, the current SnapshotId may be 6. Client 3 may read row x, as client 1's write operation has not finished, and client 3 may read the old value of row x. Client 1 may then write the new value of row x with a SnapshotId of 5.

There are three operations: Write(x), Read(x), and CreateSnapshot. Write(x) is parallel with Read(x) and CreateSnapshot, but CreateSnapshot happens before Read(x). Proof by contradiction: Since Write(x) was written into SnapshotId 5, Write(x) must be linearized before CreateSnapshot. Since Read(x) must be linearized after CreateSnapshot, Read(x) must be linearized after Write(x), so Read(x) should return the new value, which is a contradiction.

Various storage operations in a SnapshotTable storage system may have expected performance result. For example, a read to a SnapshotTable may have latency similar to that of a read to a table of another storage system, such as an Azure Table. A write to a SnapshotTable within the same snapshot may take one round-trip time ("RTT") of a read (two parallel reads) plus one RTT of a write. However, in measured situations, the two parallel reads may take anything between one to two RTTs of a read. A write to SnapshotTable after taking a snapshot should take one RTT of read (two parallel reads) plus two RTT of a write.

FIG. 1 depicts an exemplary embodiment for an environment 100 for fast snapshots of an application state in storage, according to embodiments of the present disclosure. As shown in FIG. 1, the environment 100 may include a plurality of machines 102, such as virtual machines ("VM"), connecting to storage of storage systems 106 via APIs 104.

Figure 2A:
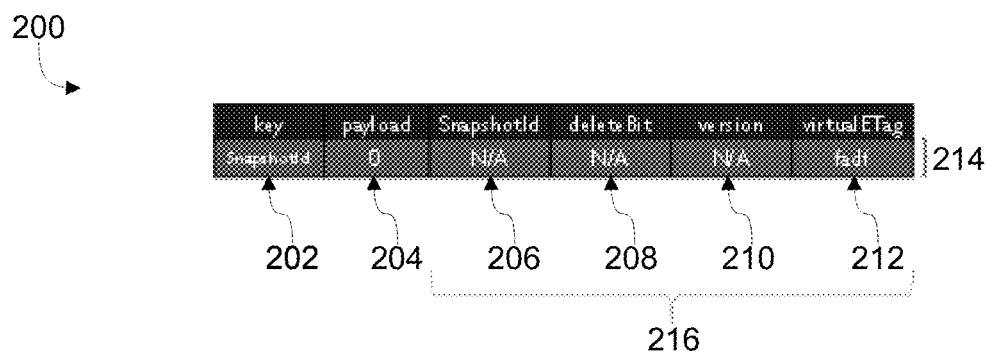
FIGS. 2A-2G depict exemplary tables for methods of fast snapshots of an application state in storage, according to embodiments of the present disclosure.

FIGS. 2A-2G depict exemplary tables for methods of fast snapshots of an application state in storage, according to embodiments of the present disclosure. In particular, FIG. 2A depicts an exemplary application table 200, according to embodiments of the present disclosure. As shown in FIG. 2A, the application table 200, when created in a storage system, may include columns for a key 202, a payload 204, a SnapshotId 206, a deleteBit 208, a version 210, and a virtualETag 212. Additionally, the application table 200 may include a special metadata row 214. For the sake of clarity, element 216 depicts the additional metadata columns that may be added to each row on an application table of a storage system. As shown in FIG. 2A, key 202 of special metadata row 214 may be a key represented as "SnapshotId," payload 204 of special metadata row 214 may be a value of a snapshot, for example, zero (0), SnapshotId 206 of special metadata row 214 may not be applicable (N/A), deleteBit 208 of special metadata row 214 may not be applicable (N/A), version 210 of special metadata row 214 may not be applicable (N/A), and virtualETag 212 of special metadata row 214 may be set to a random value, e.g., "fadf."

Figure 2B:
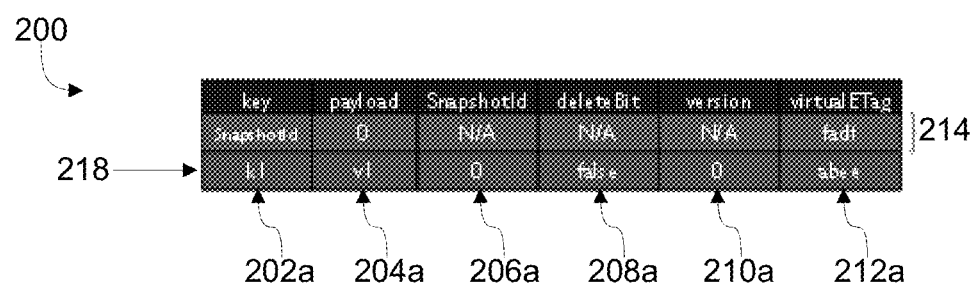

FIG. 2B depicts an exemplary application table 200 having a new row inserted, according to embodiments of the present disclosure. After the application table 200 is created, as shown in FIG. 2A, a new row 218 may be inserted into the application table 200. The new row 218 may include columns for a key 202a, a payload 204a, a SnapshotId 206a, a deleteBit 208a, a version 210a, and a virtualETag 212a. As shown in FIG. 2B, key 202a of new row 218 may be a key represented by key 1 ("k1"), payload 204a of new row 218 may be a value represented by value 1 ("v1"), SnapshotId 206a of new row 218 may be set to zero (0), i.e., the payload 204 of special metadata row 214, deleteBit 208a of new row 218 may be set to false, version 210a of new row 218 may be 0, and virtualETag 212a of new row 218 may be set to a random value, e.g., "abee."

Figure 2C:
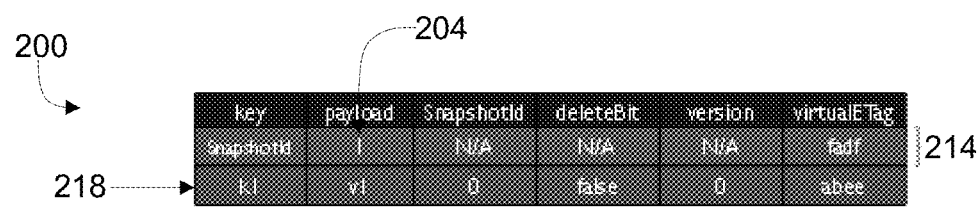

FIG. 2C depicts an exemplary application table 200 when a new snapshot is created, according to embodiments of the present disclosure. After the application table 200 is created, as shown in FIG. 2A, and a new row 218 is inserted into the application table 200, as shown in FIG. 2B, a new snapshot may be created using, for example, a CreateSnapshot( ) operation of a storage system. As shown in FIG. 2C, when a new snapshot is created, the payload 204 of the special metadata row 214 may be incremented, for example, by 1.

Figure 2D:
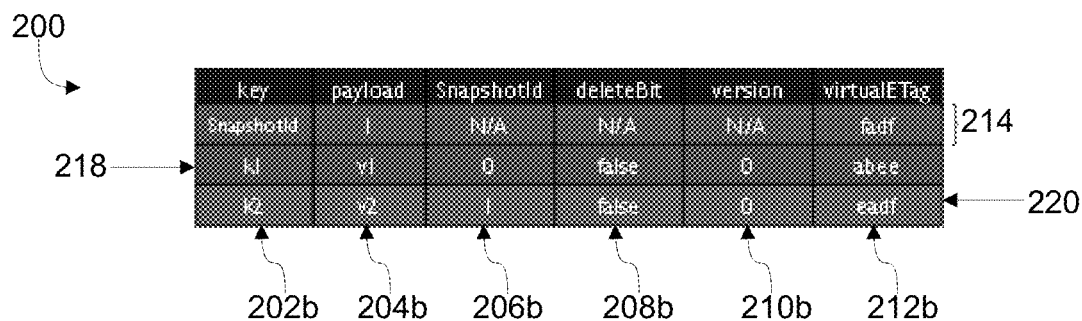

FIG. 2D depicts an exemplary application table 200 having another new row inserted, according to embodiments of the present disclosure. After the application table 200 is created, as shown in FIG. 2A, a new row 218 is inserted into the application table 200, as shown in FIG. 2B, and a new snapshot is created, as shown in FIG. 2C, a second new row 220 may be inserted into the application table 200. The second new row 220 may include columns for a key 202b, a payload 204b, a SnapshotId 206b, a deleteBit 208b, a version 210b, and a virtualETag 212b. As shown in FIG. 2D, key 202b of second new row 220 may be a key represented by key 2 ("k2"), payload 204b of second new row 220 may be a value represented by value 2 ("v2"), SnapshotId 206b of second new row 220 may be set to one (1), i.e., the payload 204 of special metadata row 214, deleteBit 208b of second new row 220 may be set to false, version 210b of second new row 220 may be 0, and virtualETag 212b of second new row 220 may be set to a random value, e.g., "eadf."

Figure 2E:
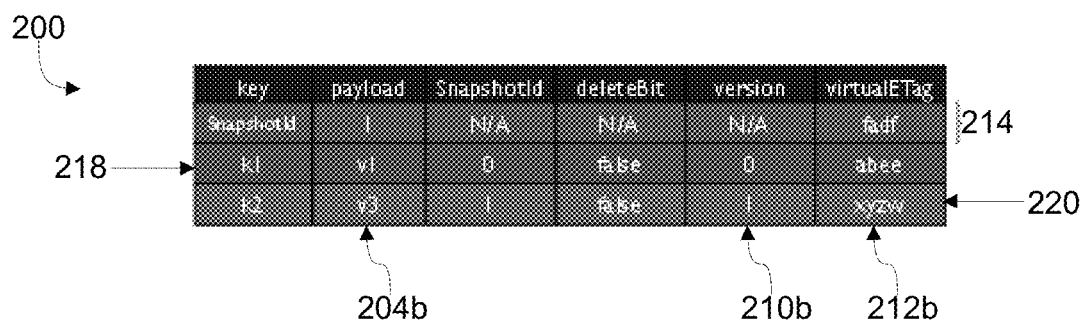

FIG. 2E depicts an exemplary application table 200 in which a payload is replaced, according to embodiments of the present disclosure. After the application table 200 is created, as shown in FIG. 2A, a new row 218 is inserted into the application table 200, as shown in FIG. 2B, a new snapshot is created, as shown in FIG. 2C, and a second new row 220 is inserted into the application table 200, as shown in FIG. 2D, a payload 204b may be replaced in the second new row 220. As shown in FIG. 2E, payload 204b of second new row 220 may be replaced by a value represented by value 3 ("v3") from the value represented by value 2 ("v2"). Version 210b of second new row 220 may be increased, for example, monotonically, when an operation is performed on second new row 220. In the example embodiment, version 210*b* is increased by one to one (1). Additionally, virtualETag 212*b* of second new row 220 may be set to a new random value, e.g., "xyzw."

Figure 2F:
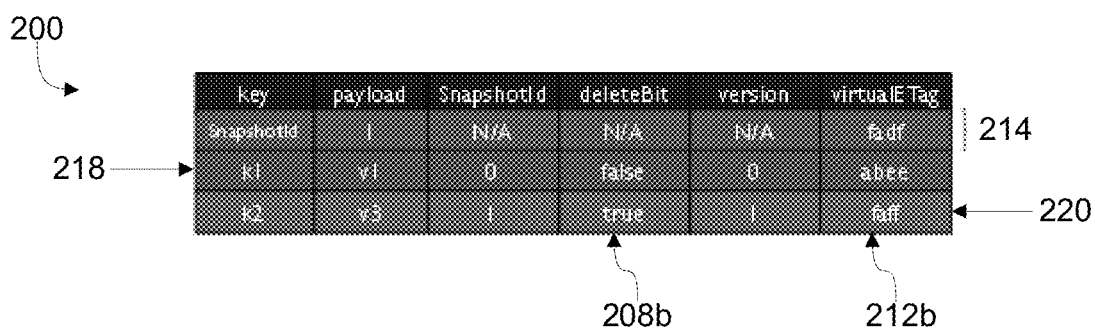

FIG. 2F depicts an exemplary application table 200 in which a row is deleted, according to embodiments of the present disclosure. After the application table 200 is created, as shown in FIG. 2A, a new row 218 is inserted into the application table 200, as shown in FIG. 2B, a new snapshot is created, as shown in FIG. 2C, a second new row 220 is inserted into the application table 200, as shown in FIG. 2D, and a payload 204*b* is replaced in the second new row 220, as shown in FIG. 2E, a row with the key of k2 may be indicated as deleted. As shown in FIG. 2F, deleteBit 208*b* of second new row 220 may be changed to "true," when a row is to be deleted. Accordingly, a row may not be removed from the table 200, rather second new row 220 has the deleteBit 208*b* set to "true." by a value represented by value 3 ("v3") from the value represented by value 2 ("v2"). Additionally, virtualETag 212*b* of second new row 220 may be set to a new random value, e.g., "faff."

Figure 2G:
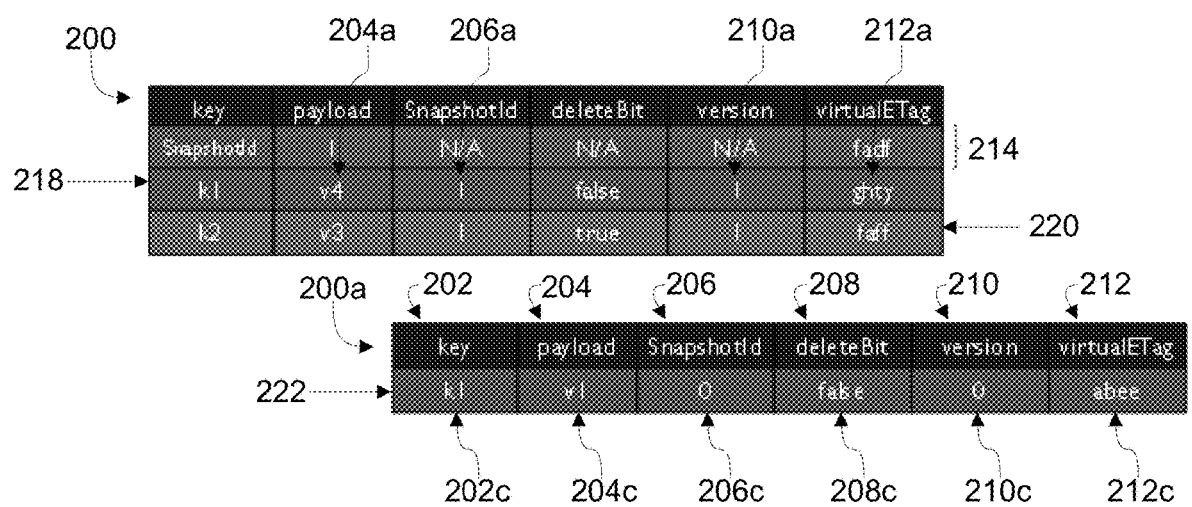

FIG. 2G depicts an exemplary application table 200 having an update to a row and saving the row to a new table prior to updating, according to embodiments of the present disclosure. After the application table 200 is created, as shown in FIG. 2A, a new row 218 is inserted into the application table 200, as shown in FIG. 2B, a new snapshot is created, as shown in FIG. 2C, a second new row 220 is inserted into the application table 200, as shown in FIG. 2D, a payload 204*b* is replaced in the second new row 220, as shown in FIG. 2E, and a row with the key of k2 is indicated as deleted, a payload 204*a* of new row 218 may be updated.

As shown in FIG. 2G, payload 204*a* of new row 218 may be replaced by a value represented by value 4 ("v4") from the value represented by value 1 ("v1"). Version 210*a* of new row 218 may be increased, for example, monotonically, when an operation is performed on new row 218. In the example embodiment, version 210*a* is increased by one to one (1), and virtualETag 212*a* of new row 218 may be set to a new random value, e.g., "ghty." Additionally, SnapshotId 206*a* of new row 218 may be set to one (1), i.e., the payload 204 of special metadata row 214.

Further, as shown in FIG. 2G, a new application table 200*a* may be created in the storage system. The new application table 200*a* may be named after the value of the SnapshotId of the row being updated, e.g., AppTable_snapshot_0. New table 200*a* may include a row 222 with fields for a key 202, a payload 204, a SnapshotId 206, a deleteBit 208, a version 210, and a virtualETag 212. The row 222 may be a copy of the new row 218 prior to the update. As shown in FIG. 2G, key 202*c* of row 222 may be the key represented by key 1 ("k1"), payload 204*c* of row 222 may be the value represented by value 1 ("v1"), which is the payload 204*a* of new row 218 prior to the update, SnapshotId 206*c* of row 222 may be set to zero (0), which is the SnapshotId 206*a* of new row 218 prior to the update, deleteBit 208*c* of row 222 may be set to false, which is the deleteBit 208*a* of new row 218 prior to the update, version 210*c* of row 222 may be 0, which is the version 210*a* of new row 218 prior to the update, and virtualETag 212*c* of row 222 may be set to the random value, e.g., "abee," which is the virtualETag 212*a* of new row 218 prior to the update.

FIGS. 3-7 depict exemplary flow diagrams for methods of fast snapshots of an application state in storage, according to embodiments of the present disclosure.

Figure 3:
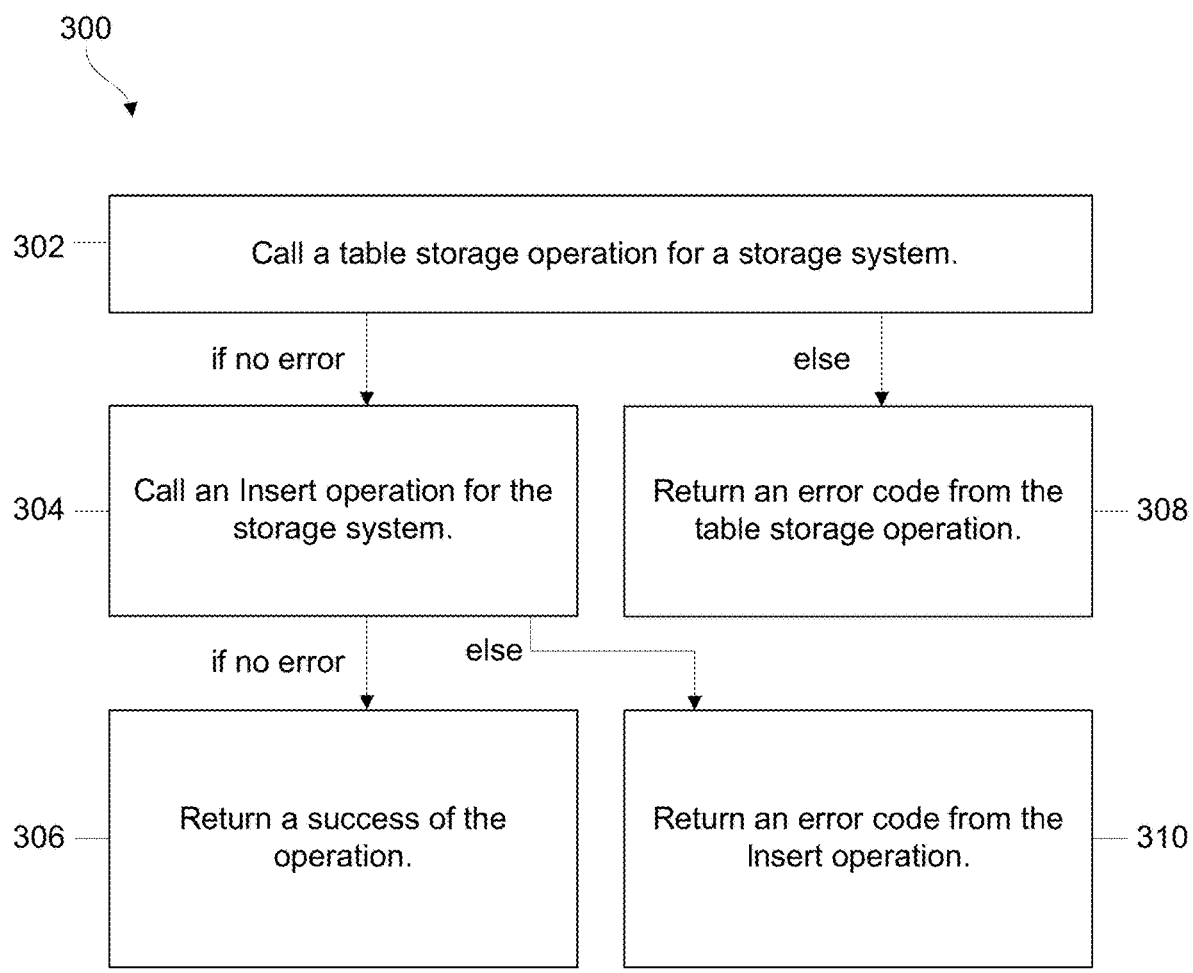
FIGS. 3-6 and 7A-7C depict exemplary flow diagrams for methods for fast snapshots of an application state in storage, according to embodiments of the present disclosure.

In particular, FIG. 3 depicts an exemplary flow diagram for a method of using a SnapshotTableCreateIfNotExists (tableName) operation, according to embodiments of the present disclosure. As mentioned above, a SnapshotTableCreateIfNotExists operation may create a new table using a table storage operation CreateIfNotExists( ). Further, the SnapshotTableCreateIfNotExists operation may create a special metadata row in the new table, which may store the current snapshot identifier ("snapshotId"), and may initialize SnapshotId value to 0. As shown in FIG. 3, a method 300 may begin at step 302 in which a table storage operation, such as CreateIfNotExists(tableName), is called for a storage system, such as a cloud storage system. If the operation is successfully performed, the method proceeds to step 304 in which an Insert operation, such as Insert(tableName, key="snapshotId", payload=0), is called for the storage system. If the operation is successfully performed, the method proceeds to step 306 in which the method ends and a success of the SnapshotTableCreateIfNotExists operation is returned. If the operation of step 302 is not successfully performed, the method proceeds to step 308 in which an error code from the CreateIfNotExists operation is returned. If the operation of step 304 is not successfully performed, the method proceeds to step 310 in which an error code from the Insert operation is returned.

Figure 4:
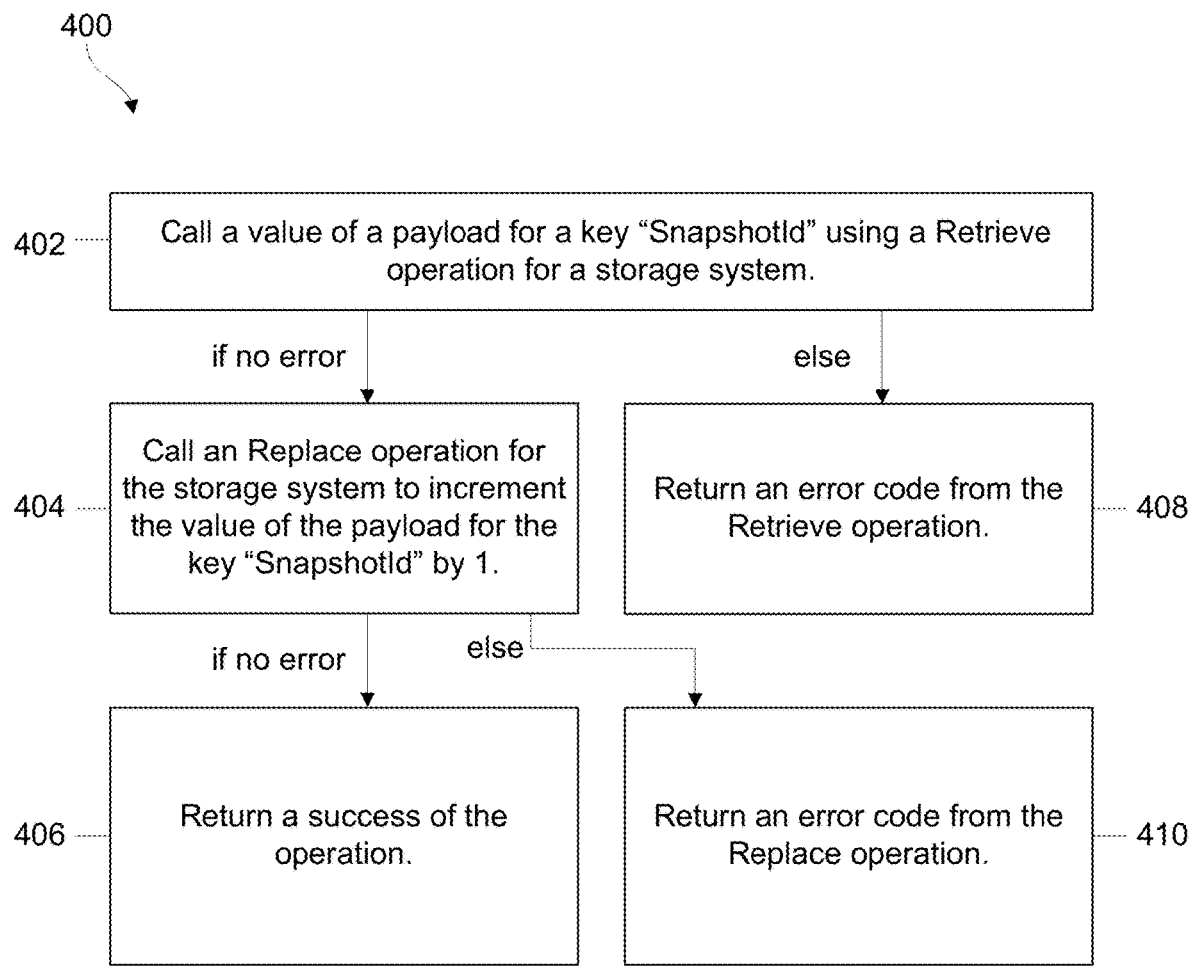

FIG. 4 depicts an exemplary flow diagram for a method of using a CreateSnapshot(tableName) operation, according to embodiments of the present disclosure. As mentioned above, a CreateSnapshot operation may use and supplement basic operations of a table storage system, and may be used to return a snapshot identifier. In particular, the CreateSnapshot operation may increment the SnapshotId stored in an underlying table. As shown in FIG. 4, a method 400 may begin at step 402 in which a Retrieve operation, such as Retrieve(tableName, key="snapshotId"), is used to call a value of a payload for a key "SnapShotId." If the operation is successfully performed, the method proceeds to step 404 in which a Replace operation, such as Replace(tableName, key="SnapshotId", payload=val+1), is called to increment the value of the payload for the key of "SnapShotId" by 1. If the operation is successfully performed, the method proceeds to step 406 in which the method ends and a success of the CreateSnapshot operation is returned. If the operation of step 402 is not successfully performed, the method proceeds to step 408 in which an error code from the Retrieve operation is returned. If the operation of step 404 is not successfully performed, the method proceeds to step 410 in which an error code from the Replace operation is returned.

Figure 5:
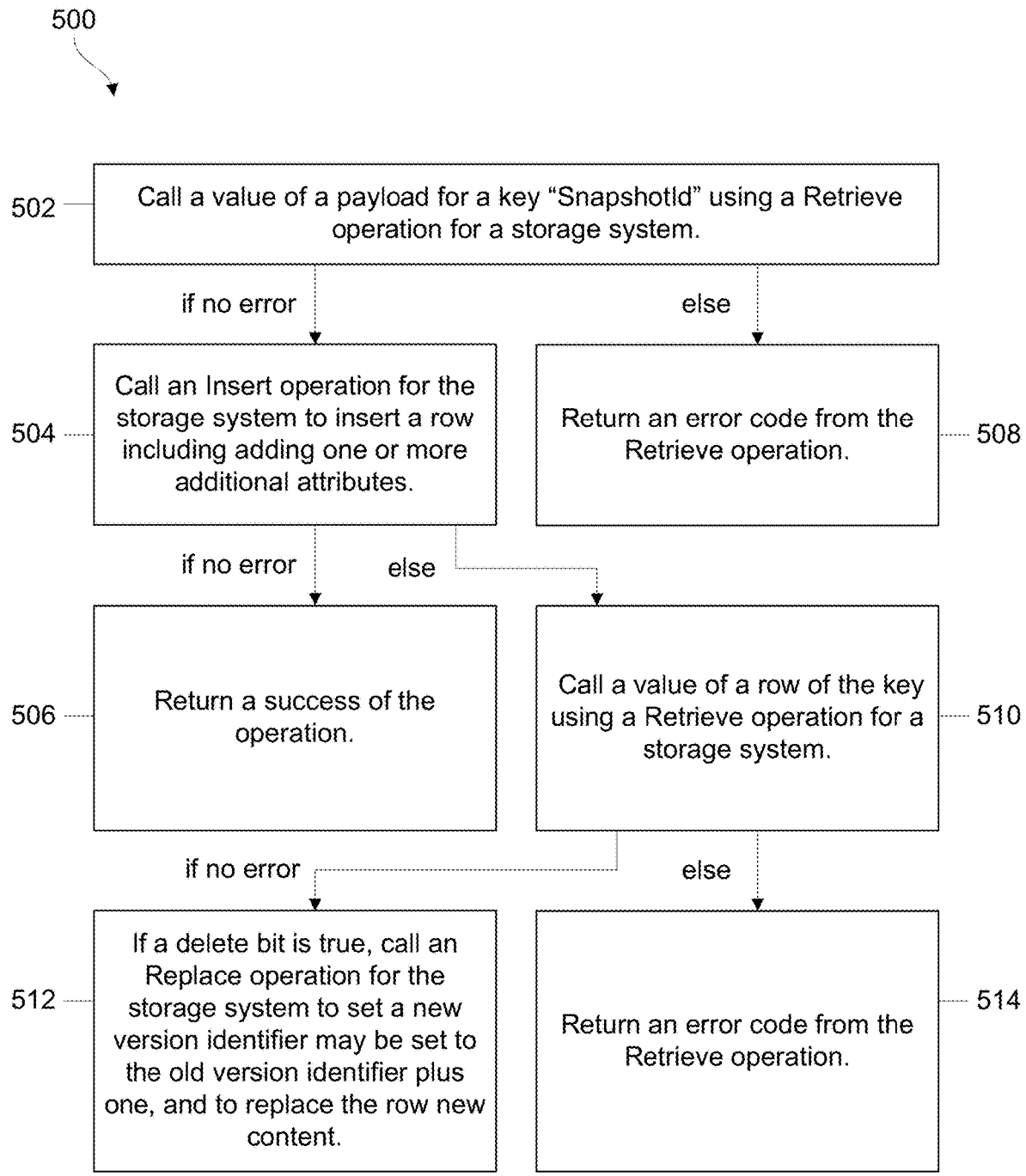

FIG. 5 depicts an exemplary flow diagram for a method of using a SnapshotTableInsert(tableName, key, payload) operation, according to embodiments of the present disclosure. As mentioned above, a SnapshotTableInsert operation may use and supplement basic operations of a table storage system. In particular, the SnapshotTableInsert operation may use a table storage operation Insert. Additionally, the SnapshotTableInsert operation may add one or more additional attributes including: (i) "SnapshotId," which keeps track of the snapshot identifier when the last update was made to a row; (ii) a delete bit; (iii) a version identifier, which may monotonically increase for each change of the row; and (iv) a virtual entity tag ("eTag").

As shown in FIG. 5, a method 500 may begin at step 502 in which a Retrieve operation, such as Retrieve(tableName, key="snapshotId"), is used to call a value of a payload for a key of "SnapShotId." In other words, the SnapshotTableInsert operation may first read the current SnapshotId from the special metadata row in the table. If the operation is successfully performed, the method proceeds to step 504, in which an Insert operation, such as Insert(tableName, key, payload, snapshotId=value, version=0, delete=False), is called to set a value of the SnapshotId to the retrieved value. In other words, the SnapshotTableInsert operation may set the row.SnapshotId to the current SnapshotId. Further, the SnapshotTableInsert operation may also initialize the version identifier to an initial value, such as one or zero, and set a random virtual eTag value. If the operation is successfully performed, the method proceeds to step 506 in which the method ends and a success of the SnapshotTableInsert operation is returned.

If the operation of step 502 is not successfully performed, the method proceeds to step 508 in which an error code from the Retrieve operation is returned. If the operation of step 504 is not successfully performed, the method proceeds to step 510 in which the row may be retrieved, and the delete bit may be checked. In other words, the Insert operation may have failed due to an existing row. If the operation of step 510 is successfully performed, the method proceeds to step 512 in which a Replace operation, such as Replace(tableName, key, payload, snapshotId=val, version=val.version+1, delete=False), is called if a value of the delete bit is True. In other words, if the delete bit indicates that the row is deleted, and a new version identifier may be set to be the old version identifier plus one, and the row may be replaced with the new content. If the operation of step 510 is not successfully performed, the method proceeds to step 514 in which an error code from the Retrieve operation is returned.

Figure 6:
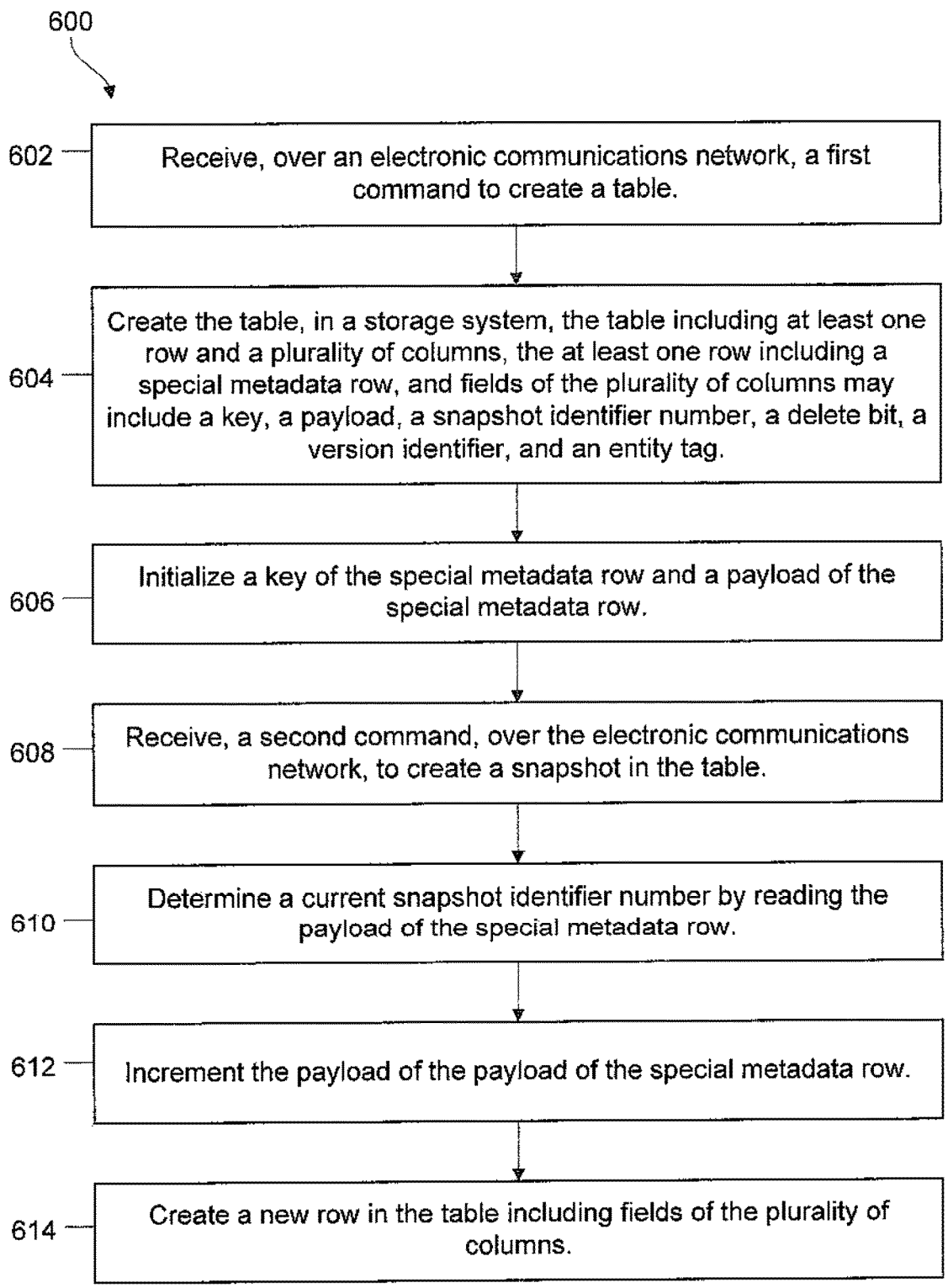

FIG. 6 depicts an exemplary flow diagram for a method for fast snapshots of an application state in storage, according to embodiments of the present disclosure. The method 600 may begin at step 602 in which a first command may be received, over an electronic communications network, to create a table. Then, at step 604, the table may be created, in a storage system, the table may include at least one row and a plurality of columns, the at least one row including a special metadata row, and fields of the plurality of columns may include a key, a payload, a snapshot identifier number, a delete bit, a version identifier, and an entity tag.

At step 606, a key of the special metadata row and a payload of the special metadata row may be initialized. The key of the special metadata row may be initialized to a snapshot identifier, and the payload of the special metadata row may be initialized to zero. An entity tag of the special metadata row may also be initialized to a random value.

The method 600 may proceed to step 608 where a second command may be received, over the electronic communications network, to create a snapshot in the table. Then, at step 610, a current snapshot identifier number may be determined by reading the payload of the special metadata row. At step 612, the payload of the special metadata row may be incremented. Then, at step 614, a new row may be created in the table including fields of the plurality of columns. A value of a snapshot identifier number of the new row may be set to the incremented payload of the special metadata row, a delete bit of the new row may be set to false, and a version identifier of the new row may be set to an initial value, such as one or zero. Additionally, an entity tag of the new row may be initialized to a random value.

Figure 7A:
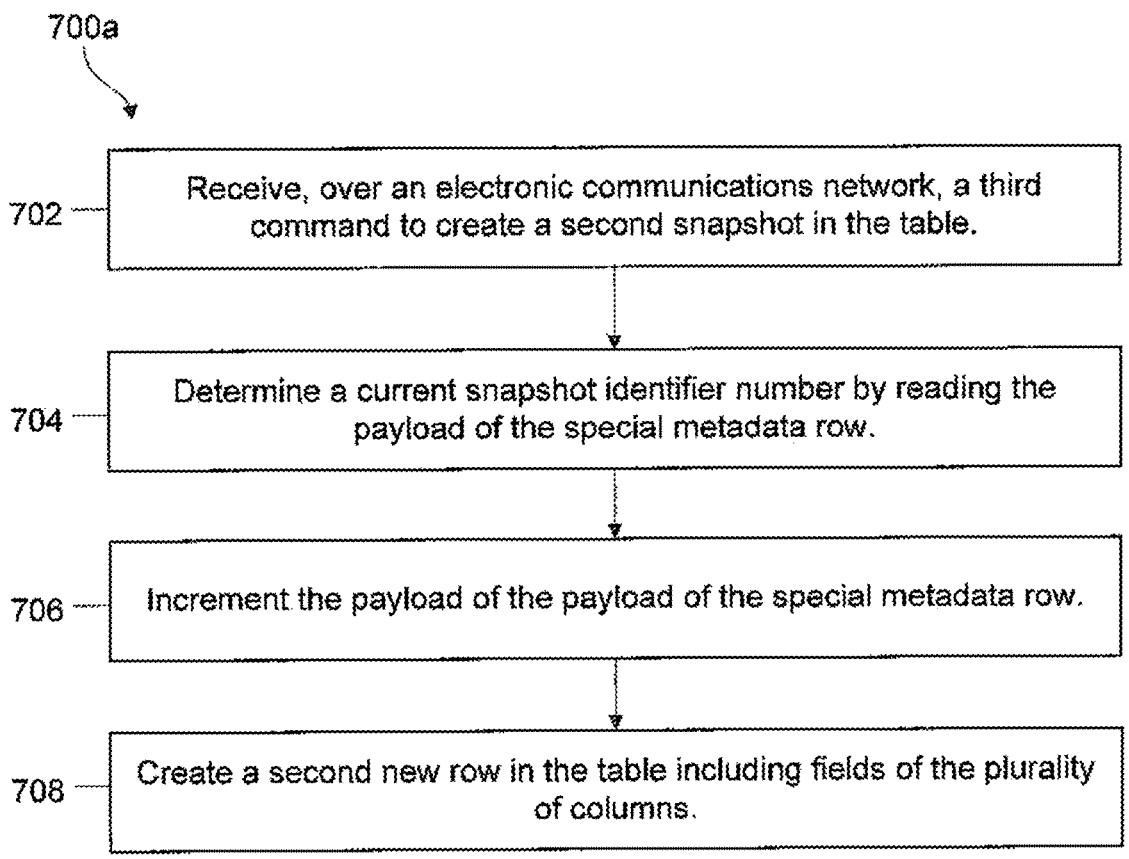
Figure 7B:
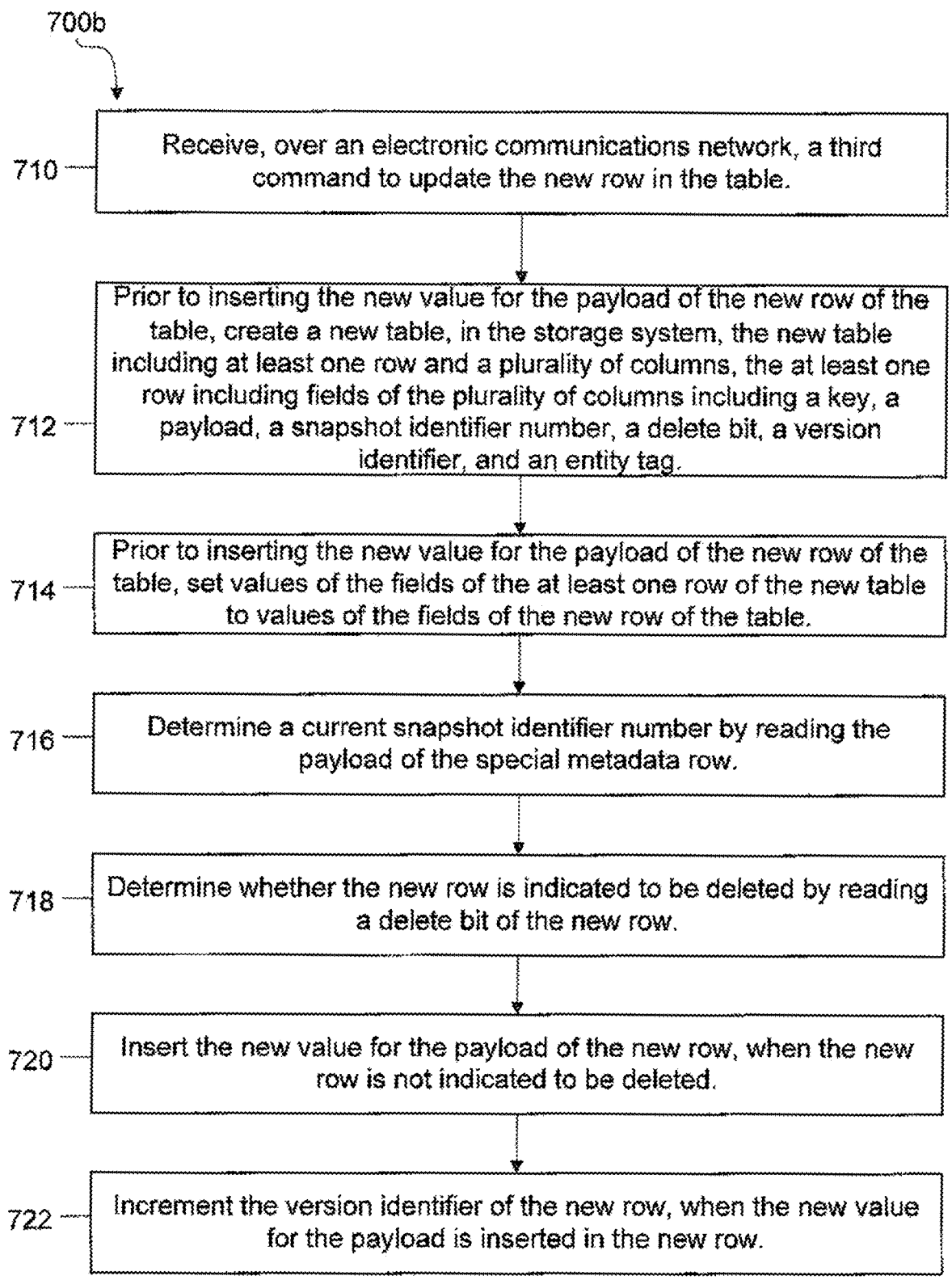
Figure 7C:
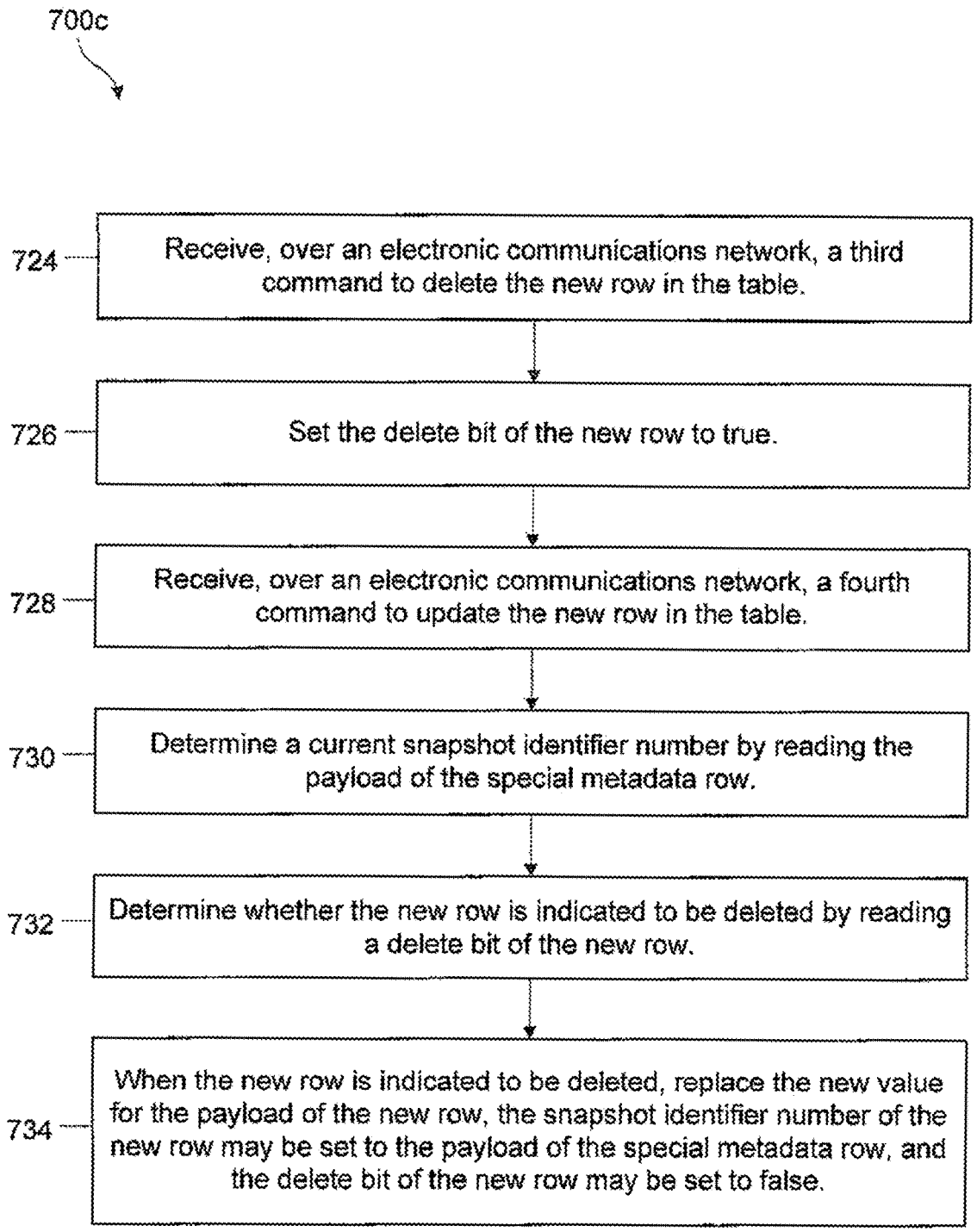

FIGS. 7A-7C depict exemplary flow diagrams for methods for fast snapshots of an application state in storage, according to embodiments of the present disclosure.

In particular, FIG. 7A depicts an exemplary flow diagram for methods for fast snapshots of an application state in storage based on one of more steps of FIGS. 6, 7B, and/or 7C being performed, according to embodiments of the present disclosure. The method 700a may begin at step 702 in which a command, such as a third command, may be received, over the electronic communications network, to create a second snapshot in the table. Then, at step 704, a current snapshot identifier number may be determined by reading the payload of the special metadata row. At step 706, the payload of the special metadata row may be incremented.

At step 708, a second new row in the table including fields of the plurality of columns may be created. A value of a snapshot identifier number of the second new row may be set to the incremented payload of the special metadata row, a delete bit of the second new row may be set to false, and a version identifier of the second new row may be set to an initial value. Additionally, an entity tag of the second new row may be initialized to a random value.

FIG. 7B depicts an exemplary flow diagram for methods for fast snapshots of an application state in storage based on one of more steps of FIGS. 6, 7A, and/or 7C being performed, according to embodiments of the present disclosure. The method 700b may begin at step 710 in which a command, such as a third command, may be received to update the new row in the table. The third command may include a new value for a payload of the new row.

At step 712, prior to inserting the new value for the payload of the new row of the table, a new table may be created, in the storage system, the new table may include at least one row and a plurality of columns, the at least one row including fields of the plurality of columns including a key, a payload, a snapshot identifier number, a delete bit, a version identifier, and an entity tag. At step 714, prior to inserting the new value for the payload of the new row of the table, values of the fields of the at least one row of the new table may be set to values of the fields of the new row of the table.

Then, at step 716, a current snapshot identifier number may be determined by reading the payload of the special metadata row. Then, at step 718, the new row may be determined whether it is indicated to be deleted by reading a delete bit of the new row. At step 720, the new value for the payload of the new row may be inserted, when the new row is not indicated to be deleted. At step 722, the version identifier of the new row may be incremented, when the new value for the payload is inserted in the new row. Additionally, the snapshot identifier number of the new row may be set to the payload of the special metadata row, and an entity tag of the new row may be set to a random value.

FIG. 7C depicts an exemplary flow diagram for methods for fast snapshots of an application state in storage based on one of more steps of FIGS. 6, 7A, and/or 7B being performed, according to embodiments of the present disclosure. The method 700c may begin at step 724 in which a command, such as a third command, may be received, over the electronic communications network, to delete the new row in the table. Then, at step 726, the delete bit of the new row may be set to true.

At step 728, a command, such as a fourth command, may be received, over the electronic communications network, to update the new row in the table. The fourth command may include a new value for a payload of the new row. At step 730, a current snapshot identifier number may be determined by reading the payload of the special metadata row, and then, at step 732, the new row may be determined whether it is indicated to be deleted by reading the delete bit of the new row.

When the new row is indicated to be deleted, at step 734, the new value for the payload of the new row may be replaced, the snapshot identifier number of the new row may be set to the payload of the special metadata row, and the delete bit of the new row may be set to false. Additionally, the entity tag of the new row may be initialized to a new random value.

Figure 8:
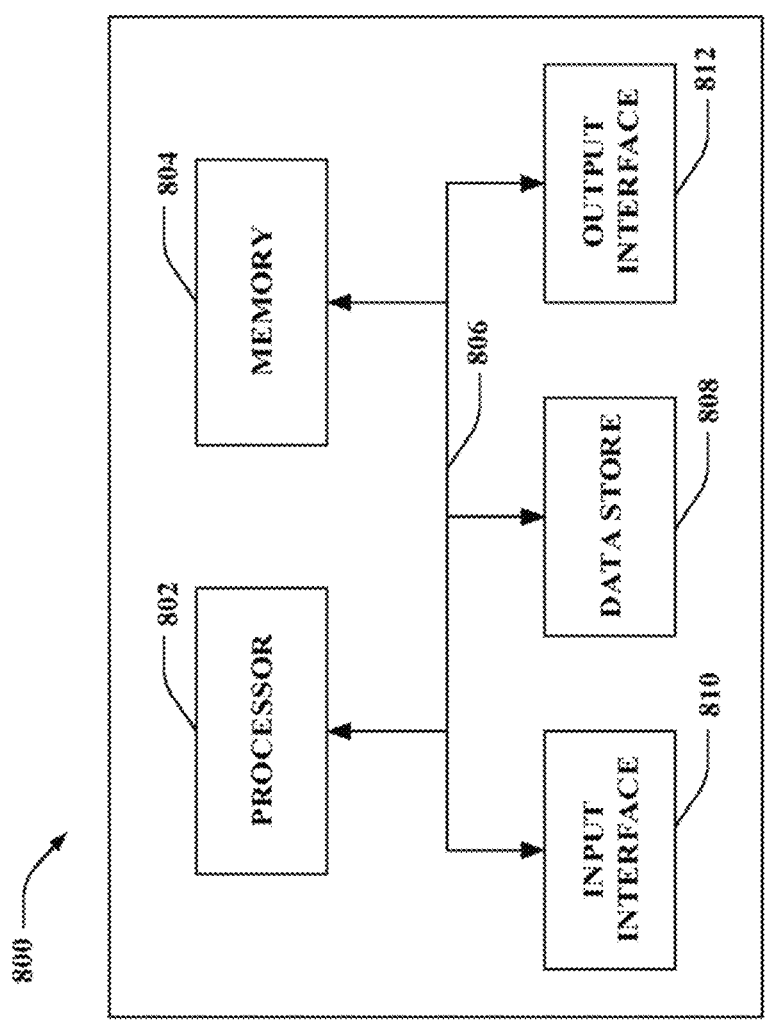
FIG. 8 depicts a high-level illustration of an exemplary computing device that may be used in accordance with the systems, methods, and computer-readable media disclosed herein, according to embodiments of the present disclosure.

FIG. 8 depicts a high-level illustration of an exemplary computing device 800 that may be used in accordance with the systems, methods, and computer-readable media disclosed herein, according to embodiments of the present disclosure. For example, the computing device 800 may be used in a system that performs methods for a fast snapshot of application data in storage, according to embodiments of the present disclosure. The computing device 800 may include at least one processor 802 that executes instructions that are stored in a memory 804. The instructions may be, for example, instructions for implementing functionality described as being carried out by one or more components discussed above or instructions for implementing one or more of the methods described above. The processor 802 may access the memory 804 by way of a system bus 806. In addition to storing executable instructions, the memory 804 may also store snapshots, event logs, and so forth.

The computing device 800 may additionally include a data store 808 that is accessible by the processor 802 by way of the system bus 806. The data store 808 may include executable instructions, data, examples, features, etc. The computing device 800 may also include an input interface 810 that allows external devices to communicate with the computing device 800. For instance, the input interface 810 may be used to receive instructions from an external computer device, from a user, etc. The computing device 800 also may include an output interface 812 that interfaces the computing device 800 with one or more external devices. For example, the computing device 800 may display text, images, etc. by way of the output interface 812.

It is contemplated that the external devices that communicate with the computing device 800 via the input interface 810 and the output interface 812 may be included in an environment that provides substantially any type of user interface with which a user can interact. Examples of user interface types include graphical user interfaces, natural user interfaces, and so forth. For example, a graphical user interface may accept input from a user employing input device(s) such as a keyboard, mouse, remote control, or the like and may provide output on an output device such as a display. Further, a natural user interface may enable a user to interact with the computing device 800 in a manner free from constraints imposed by input device such as keyboards, mice, remote controls, and the like. Rather, a natural user interface may rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for example, several devices may be in communication by way of a network connection and may collectively perform tasks described as being performed by the computing device 800.

Figure 9:
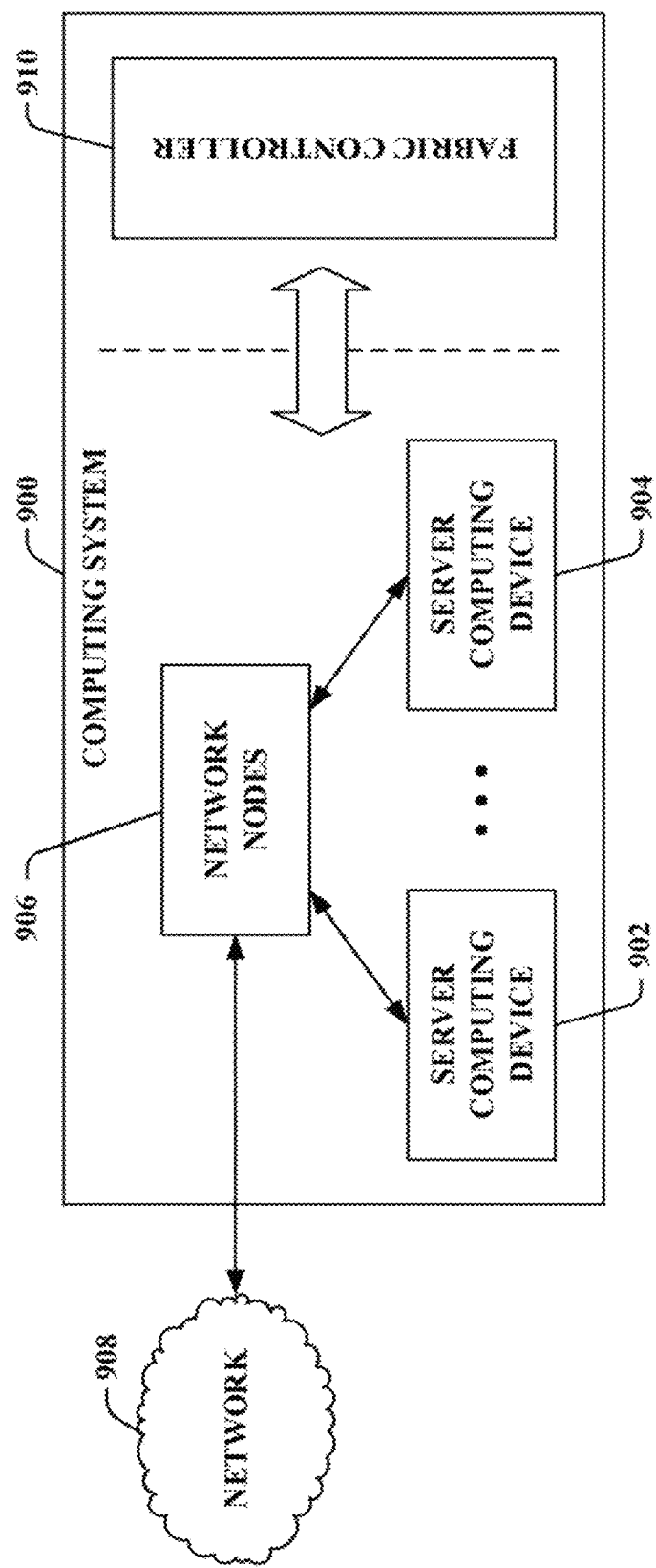
FIG. 9 depicts a high-level illustration of an exemplary computing system that may be used in accordance with the systems, methods, and computer-readable media disclosed herein, according to embodiments of the present disclosure.

Turning to FIG. 9, FIG. 9 depicts a high-level illustration of an exemplary computing system 900 that may be used in accordance with the systems, methods, and computer-readable media disclosed herein, according to embodiments of the present disclosure. For example, the computing system 900 may be or may include the computing device 800. Additionally, and/or alternatively, the computing device 800 may be or may include the computing system 900.

The computing system 900 may include a plurality of server computing devices, such as a server computing device 902 and a server computing device 904 (collectively referred to as server computing devices 902-904). The server computing device 902 may include at least one processor and a memory; the at least one processor executes instructions that are stored in the memory. The instructions may be, for example, instructions for implementing functionality described as being carried out by one or more components discussed above or instructions for implementing one or more of the methods described above. Similar to the server computing device 902, at least a subset of the server computing devices 902-904 other than the server computing device 902 each may respectively include at least one processor and a memory. Moreover, at least a subset of the server computing devices 902-904 may include respective data stores.

Processor(s) of one or more of the server computing devices 902-904 may be or may include the processor, such as processor 802. Further, a memory (or memories) of one or more of the server computing devices 902-904 can be or include the memory, such as memory 804. Moreover, a data store (or data stores) of one or more of the server computing devices 902-904 may be or may include the data store, such as data store 808.

The computing system 900 may further include various network nodes 906 that transport data between the server computing devices 902-904. Moreover, the network nodes 906 may transport data from the server computing devices 902-904 to external nodes (e.g., external to the computing system 900) by way of a network 908. The network nodes 902 may also transport data to the server computing devices 902-904 from the external nodes by way of the network 908. The network 908, for example, may be the Internet, a cellular network, or the like. The network nodes 906 may include switches, routers, load balancers, and so forth.

A fabric controller 910 of the computing system 900 may manage hardware resources of the server computing devices 902-904 (e.g., processors, memories, data stores, etc. of the server computing devices 902-904). The fabric controller 910 may further manage the network nodes 906. Moreover, the fabric controller 910 may manage creation, provisioning, de-provisioning, and supervising of environments instantiated upon the server computing devices 902-904.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Various functions described herein may be implemented in hardware, software, or any combination thereof. If implemented in software, the functions may be stored on and/or transmitted over as one or more instructions or code on a computer-readable medium. Computer-readable media may include computer-readable storage media. A computer-readable storage media may be any available storage media that may be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, may include compact disc ("CD"), laser disc, optical disc, digital versatile disc ("DVD"), floppy disk, and Blu-ray disc ("BD"), where disks usually reproduce data magnetically and discs usually reproduce data optically with lasers. Further, a propagated signal is not included within the scope of computer-readable storage media. Computer-readable media may also include communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio and microwave are included in the definition of communication medium. Combinations of the above may also be included within the scope of computer-readable media.

Alternatively, and/or additionally, the functionality described herein may be performed, at least in part, by one or more hardware logic components. For example, and without limitation, illustrative types of hardware logic components that may be used include Field-Programmable Gate Arrays ("FPGAs"), Application-Specific Integrated Circuits ("ASICs"), Application-Specific Standard Products ("ASSPs"), System-on-Chips ("SOCs"), Complex Programmable Logic Devices ("CPLDs"), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims.

What is claimed is:

1. A computer-implemented method for a fast snapshot of application data in a storage system, the method comprising:
    receiving, over an electronic communications network, a first command to create a table for a snapshot;
    creating, in a storage system, the table including at least one row and a plurality of columns, the at least one row including a special metadata row, and fields of the plurality of columns including a key, a payload, a snapshot identifier number, a delete bit, a version identifier, and an entity tag; and
    initializing a key of the special metadata row to a snapshot identifier and a payload of the special metadata row to a predetermined value.

2. The method according to claim 1, wherein the predetermined value of the initialized payload of the special metadata row is zero.

3. The method according to claim 1, further comprising: initializing an entity tag of the special metadata row to a random value.

4. The method according to claim 1, further comprising:
    receiving, over the electronic communications network, a second command to create a snapshot in the table;
    determining a current snapshot identifier number by reading the payload of the special metadata row;
    incrementing the payload of the special metadata row;
    creating a new row in the table including fields of the plurality of columns, wherein a value of a snapshot identifier number of the new row being set to the incremented payload of the special metadata row; and
    setting a delete bit of the new row to false, and a version identifier of the new row to an initial value.

5. The method according to claim 4, further comprising: initializing an entity tag of the new row to a random value.

6. The method according to claim 4, further comprising:
    receiving, over the electronic communications network, a third command to create a second snapshot in the table;
    determining a current snapshot identifier number by reading the payload of the special metadata row;
    incrementing the payload of the special metadata row;
    creating a second new row in the table including fields of the plurality of columns, wherein a value of a snapshot identifier number of the second new row being set to the incremented payload of the special metadata row; and
    setting a delete bit of the second new row to false, and a version identifier of the second new row to an initial value.

7. The method according to claim 6, further comprising: initializing an entity tag of the second new row to a random value.

8. The method according to claim 4, further comprising:
    receiving, over the electronic communications network, a third command to update the new row in the table, the third command including a new value for a payload of the new row;
    determining a current snapshot identifier number by reading the payload of the special metadata row;
    determining whether the new row is indicated to be deleted by reading a delete bit of the new row;
    inserting the new value for the payload of the new row, when the new row is not indicated to be deleted; and
    incrementing the version identifier of the new row, when the new value for the payload is inserted in the new row.

9. The method according to claim 8, further comprising:
    setting the snapshot identifier number of the new row to the payload of the special metadata row; and
    setting an entity tag of the new row to a random value.

10. The method according to claim 8, further comprising:
    creating, in the storage system prior to inserting the new value for the payload of the new row of the table, a new table including at least one row and a plurality of columns, the at least one row including fields of the plurality of columns including a key, a payload, a snapshot identifier number, a delete bit, a version identifier, and an entity tag; and
    setting, prior to inserting the new value for the payload of the new row of the table, values of the fields of the at least one row of the new table to values of the fields of the new row of the table.

11. The method according to claim 4, further comprising:
    receiving, over the electronic communications network, a third command to delete the new row in the table; and
    setting the delete bit of the new row to true.

12. The method according to claim 11, further comprising:
    receiving, over the electronic communications network, a fourth command to update the new row in the table, the fourth command including a new value for a payload of the new row;
    determining a current snapshot identifier number by reading the payload of the special metadata row;
    determining whether the new row is indicated to be deleted by reading the delete bit of the new row;
    replacing the new value for the payload of the new row, when the new row is indicated to be deleted;

setting the snapshot identifier number of the new row to the payload of the special metadata row; and setting the delete bit of the new row to false.

13. The method according to claim 12, further comprising:

initializing the entity tag of the new row to a new random value.

14. A system for a fast snapshot of application data in a storage system, comprising:

a non-transitory memory; and one or more hardware processors coupled to the non-transitory memory and configured to read instructions from the non-transitory memory to cause the system to perform a method for a fast snapshot of application data in a storage system, the method comprising:

receiving, over an electronic communications network, a first command to create a table for a snapshot;

creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row to a snapshot identifier and a payload of the special metadata row to a predetermined value.

15. The system according to claim 14, wherein the predetermined value of the initialized payload of the special metadata row is zero.

16. The system according to claim 14, further comprising:

receiving, over the electronic communications network, a second command to create a snapshot in the table;

determining a current snapshot identifier number by reading the payload of the special metadata row;

incrementing the payload of the special metadata row;

creating a new row in the table including fields of the plurality of columns, wherein a value of a snapshot identifier number of the new row being set to the incremented payload of the special metadata row; and setting a delete bit of the new row to false, and a version identifier of the new row to an initial value.

17. The system according to claim 16, further comprising:

receiving, over the electronic communications network, a third command to create a second snapshot in the table;

determining a current snapshot identifier number by reading the payload of the special metadata row;

incrementing the payload of the special metadata row;

creating a second new row in the table including fields of the plurality of columns, wherein a value of a snapshot identifier number of the second new row being set to the incremented payload of the special metadata row; and setting a delete bit of the second new row to false, and a version identifier of the second new row to an initial value.

18. A non-transitory computer-readable medium having stored thereon computer-readable instructions executable to cause a computer to perform a method for a fast snapshot of application data in a storage system, the method comprising:

receiving, over an electronic communications network, a first command to create a table for a snapshot;

creating, in a storage system, the table including at least one row and a plurality of columns, the at least one row including a special metadata row, and fields of the plurality of columns including a key, a payload, a snapshot identifier number, a delete bit, a version identifier, and an entity tag; and initializing a key of the special metadata row to a snapshot identifier and a payload of the special metadata row to a predetermined value.

19. The computer-readable medium according to claim 18, wherein the predetermined value of the initialized payload of the special metadata row is zero.

20. The computer-readable medium according to claim 18, further comprising:

receiving, over the electronic communications network, a second command to create a snapshot in the table;

determining a current snapshot identifier number by reading the payload of the special metadata row;

incrementing the payload of the special metadata row;

creating a new row in the table including fields of the plurality of columns, wherein a value of a snapshot identifier number of the new row being set to the incremented payload of the special metadata row; and setting a delete bit of the new row to false, and a version identifier of the new row to an initial value.

* * * * *